US012170419B2

(12) United States Patent
Lai et al.

(10) Patent No.: US 12,170,419 B2
(45) Date of Patent: Dec. 17, 2024

(54) ELECTRICAL CONNECTOR

(71) Applicants: Austin Lai, Taichung (TW); Chao-I Chien, Taichung (TW)

(72) Inventors: Austin Lai, Taichung (TW); Chao-I Chien, Taichung (TW)

( * ) Notice: Subject to any disclaimer, the term of this patent is extended or adjusted under 35 U.S.C. 154(b) by 375 days.

(21) Appl. No.: 17/832,659

(22) Filed: Jun. 5, 2022

(65) Prior Publication Data

US 2023/0396010 A1 Dec. 7, 2023

(51) Int. Cl.
*H01R 12/70* (2011.01)
*H01R 13/04* (2006.01)
*H01R 103/00* (2006.01)

(52) U.S. Cl.
CPC ......... *H01R 13/04* (2013.01); *H01R 12/7088* (2013.01); *H01R 2103/00* (2013.01)

(58) Field of Classification Search
None
See application file for complete search history.

(56) References Cited

U.S. PATENT DOCUMENTS 9,437,961 B1 * 9/2016 Smajda .................. H01R 13/28
10,439,315 B2 * 10/2019 Dai ...................... H01R 13/665
10,490,937 B1 * 11/2019 Su .......................... H01R 24/64
11,075,483 B2 * 7/2021 Lai ..................... H01R 13/5219
11,081,825 B1 * 8/2021 Lai ......................... H01R 13/64
11,128,077 B1 * 9/2021 Lai ........................ H01R 13/111
11,476,608 B2 * 10/2022 Lin ...................... H01R 13/112
11,757,228 B2 * 9/2023 Lai ....................... H01R 13/707 439/587
2015/0207279 A1 * 7/2015 Little ..................... H01R 24/60 439/676
2018/0269619 A1 * 9/2018 Beimdieck ............. H01R 13/42
2019/0027855 A1 * 1/2019 Dai ........................ H01R 12/57
2020/0163658 A1 * 5/2020 Krinninger .......... H01R 33/765
2023/0067836 A1 * 3/2023 Lai ..................... H01R 13/5219
2023/0396010 A1 * 12/2023 Lai ....................... H01R 13/533
2023/0420878 A1 * 12/2023 Brown ..................... G01K 7/22

* cited by examiner

*Primary Examiner* — Ross N Gushi
(74) *Attorney, Agent, or Firm* — Ying-Ting Chen; Law Office of Michael Chen

(57) ABSTRACT

An electrical connector may include a first terminal and a second terminal, which are adapted to be connected to together, and the first terminal has a first base, and a signal base and a spacer plate are formed in the first base. A plurality of guiding flanges protrude from the spacer plate, and the spacer plate has a plurality of pin holes thereon, and two plug rods separated by the spacer plate are installed in the first base. The second terminal comprises a second base, and a signal socket and two plug rod bases are formed in the second base, and the signal socket is connected to the two plug rod bases. Each of the plug rod bases has a plug hole, and a guiding space is formed between the two plug rod bases to receive the spacer plate.

10 Claims, 12 Drawing Sheets

ELECTRICAL CONNECTOR

FIELD OF THE INVENTION

The present invention relates to an electrical connector and more particularly to an electrical connector having flexible terminal types with easy connection.

BACKGROUND OF THE INVENTION

The electrical connector is widely used for current or signal transmission, such as connection between the controllers, and connection between the electric vehicle and the power supply. In some cases, the connection quality of the electrical connector used on the machine may be suffered due to severely shaken. For example, the electric vehicle drives through the road bump. Also, one way to improve the connection quality is to make sure the terminals firmly connected.

Moreover, the electrical connectors are commonly used to transport both large current signal and small current signal, so that the types of the terminals on the connector have to be adjusted according to the actual needs, and furthermore, the manufacturing costs will rise due to different production lines for different electrical connectors. Therefore, there remains a need for a new and improved design for an electrical connector to overcome the problems presented above.

SUMMARY OF THE INVENTION

The present invention provides an electrical connector comprising a first terminal and a second terminal, and the first terminal has a first base, and a signal base and a spacer plate are formed in the first base. A plurality of guiding flanges protrude from the spacer plate, and the spacer plate has a plurality of pin holes thereon, and two plug rods separated by the spacer plate are installed in the first base. The second terminal comprises a second base, and a signal socket and two plug rod bases are formed in the second base, and the signal socket is connected to the two plug rod bases. Each of the plug rod bases has a plug hole, and a guiding space is formed between the two plug rod bases to receive the spacer plate. A plurality of guiding grooves are formed on the guiding space at the positions corresponding to the guiding flanges of the spacer plate, and the guiding space comprises a plurality of plug pins therein. The first base of the first terminal is inserted into the second base of the second terminal, and the plug rods are respectively inserted into the plug holes of the plug rod bases, and the guiding flanges are configured to respectively couple with the guiding grooves so as to guide the spacer plate to be positioned into the guiding space, and the plug pins are adapted to respectively insert into the pin holes, thereby completing the connection between the first terminal and second terminal.

In one embodiment, the signal base further comprises a plurality of signal pins while the signal socket further has a plurality of signal holes, and when the first base of the first terminal is inserted into the second base of the second terminal, the signal pins are respectively inserted into the signal holes so as to transmit small current and small signal.

In another embodiment, a wave-shape elastic ring is disposed on the outer periphery of the first base, and when the first base of the first terminal is inserted into the second base of the second terminal, the elastic ring is configured to bear against the inner surface of the second base so as to achieve the anti-slip and waterproof effects.

In still another embodiment, each pair of the plug pin and the pin hole is used as a terminal and a port for transmitting small current or small signal.

In a further embodiment, each pair of the plug pin and the pin hole has no conductive function and is used for guiding and stabilizing the structure.

In still a further embodiment, each pair of the plug rod and the plug hole is used as a terminal and a port for transmitting large current or large signal.

In an advantageous embodiment, each pair of the plug rod and the plug hole has no conductive function and is used for guiding and stabilizing the structure.

Comparing with conventional electrical connector, the present invention is advantageous because: (i) the electrical connector has more than three connecting points between the first terminal and the second terminal, which significantly improves the connection thereof; and (ii) the pair of the plug and the pin hole can be used as a terminal and a port for transmitting small current or small signal or can have no conductive function and only be used for guiding and stabilizing the structure; and the pair of the plug rod and the plug hole can be used as a terminal and a port for transmitting large current or large signal or can have no conductive function and only be used for guiding and stabilizing the structure, that makes the terminal shape adjusted according to the intensity of current.

DETAILED DESCRIPTION OF THE INVENTION

Figure 1:
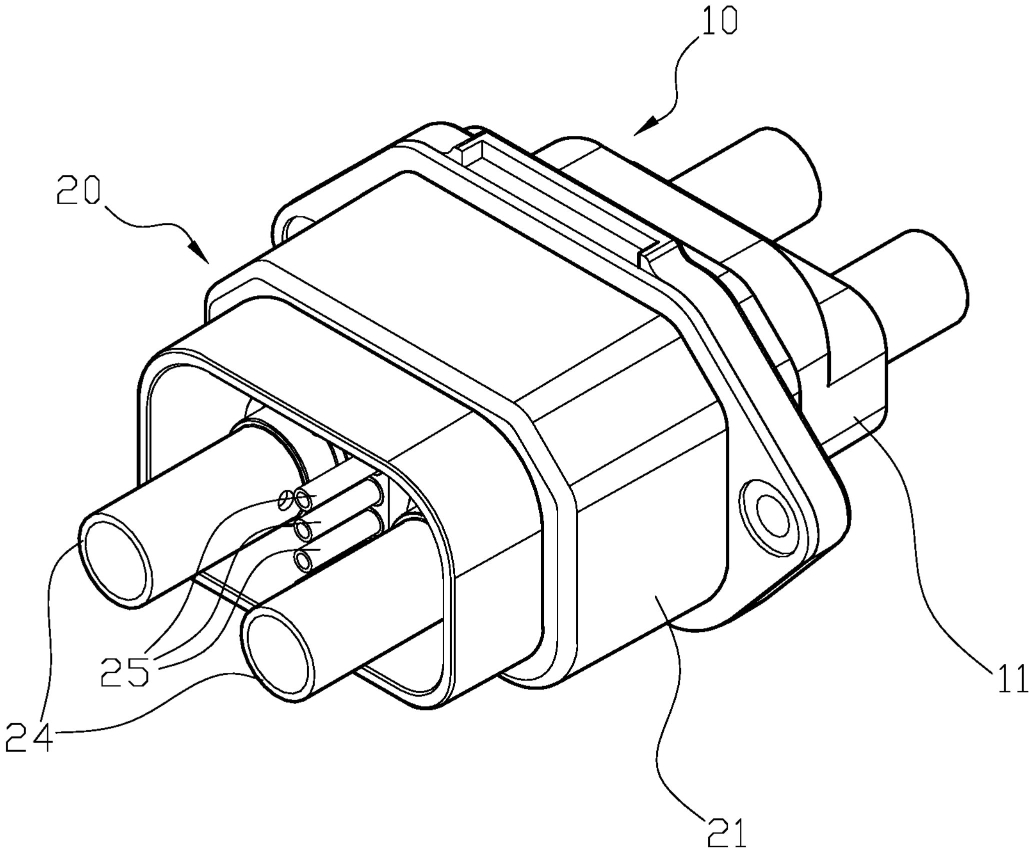
FIG. 1 is a three-dimensional assembly view of an electrical connector of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides an electrical connector comprising a first terminal (10) and a second terminal (20), and the first terminal (10) has a first base (11), and a signal base (12) and a spacer plate (13) are formed in the first base (11). Moreover, a plurality of guiding flanges (131) protrude from the spacer plate (13), and the spacer plate (13) has a plurality of pin holes (14) thereon, and two plug rods (15) separated by the spacer plate (13) are installed in the first base (10). The second terminal (20) comprises a second base (21), and a signal socket (22) and two plug rod bases (23) are formed in the second base (21), and the signal socket (22) is connected to the two plug rod bases (23). Furthermore, each of the plug rod bases (23) has a plug hole (24), and a guiding space (231) is formed between the two plug rod bases (23) to receive the spacer plate (13). Also, a plurality of guiding grooves are formed on the guiding space (231) at the positions corresponding to the guiding flanges (131) of the spacer plate (13), and the guiding space (231) comprises a plurality of plug pins (25) therein.

Referring to FIGS. 5 to 8, the first base (11) of the first terminal (10) is inserted into the second base (21) of the second terminal (21), and the plug rods (15) are respectively inserted into the plug holes (24) of the plug rod bases (23), and the guiding flanges (131) are configured to respectively couple with the guiding grooves (2311) so as to guide the spacer plate (13) to be positioned into the guiding space (231), and the plug pins (25) are adapted to respectively insert into the pin holes (14), thereby completing the connection between the first terminal (10) and second terminal (20).

Since there are multiple positions between the first terminal (10) and the second terminal (20) are connected, which forms the firm connections, and the cooperation between the guiding flanges (131) and the guiding grooves (2311) not only secures the connection between the first terminal (10) and the second terminal (20), but also better guides the spacer plate (13) to slide into the guiding space (231), thereby facilitating the connection between the first terminal (10) and the second terminal (20).

Figure 3:
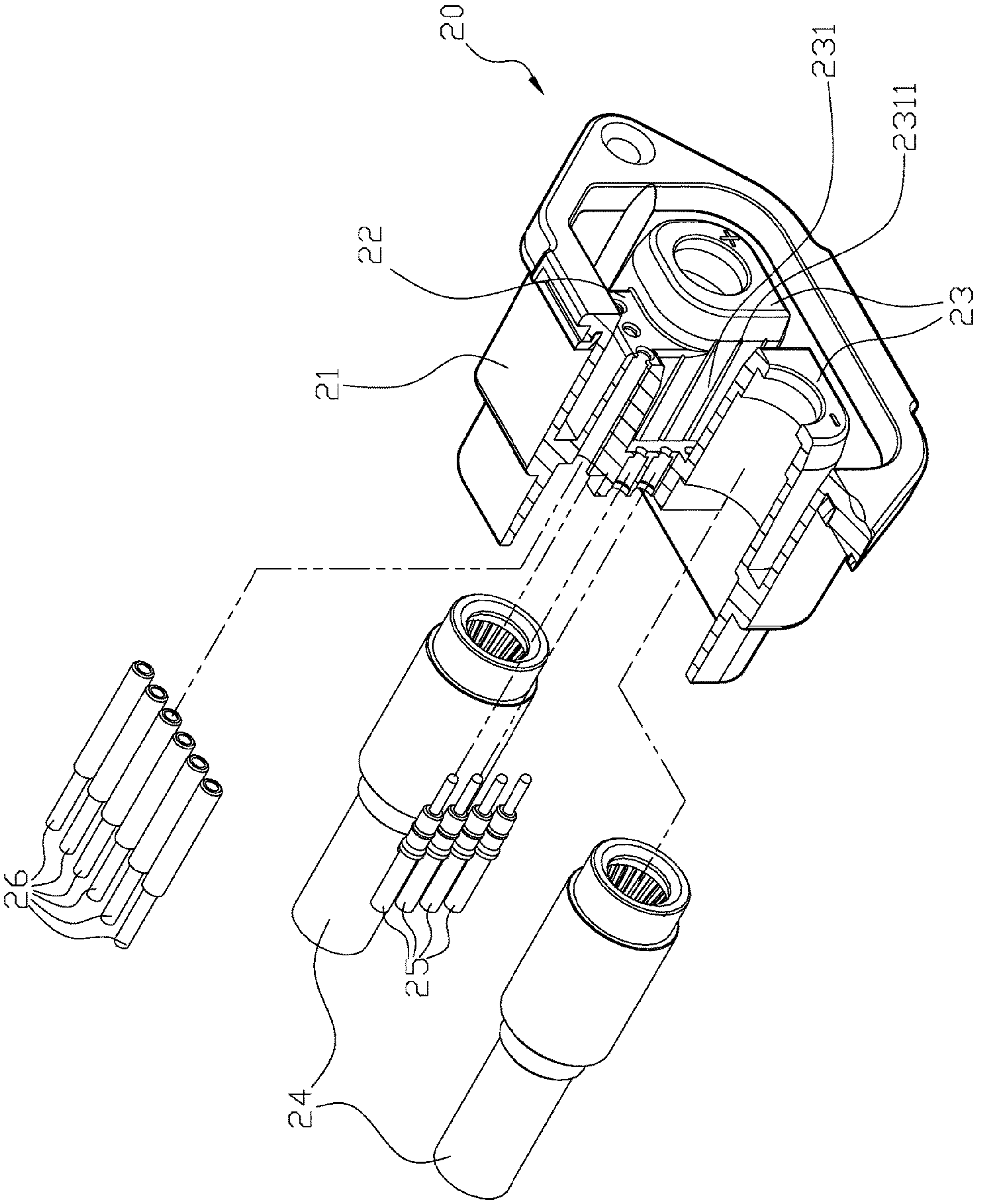
FIG. 3 is an exploded view of a second terminal of the electrical connector of the present invention.
Figure 4:
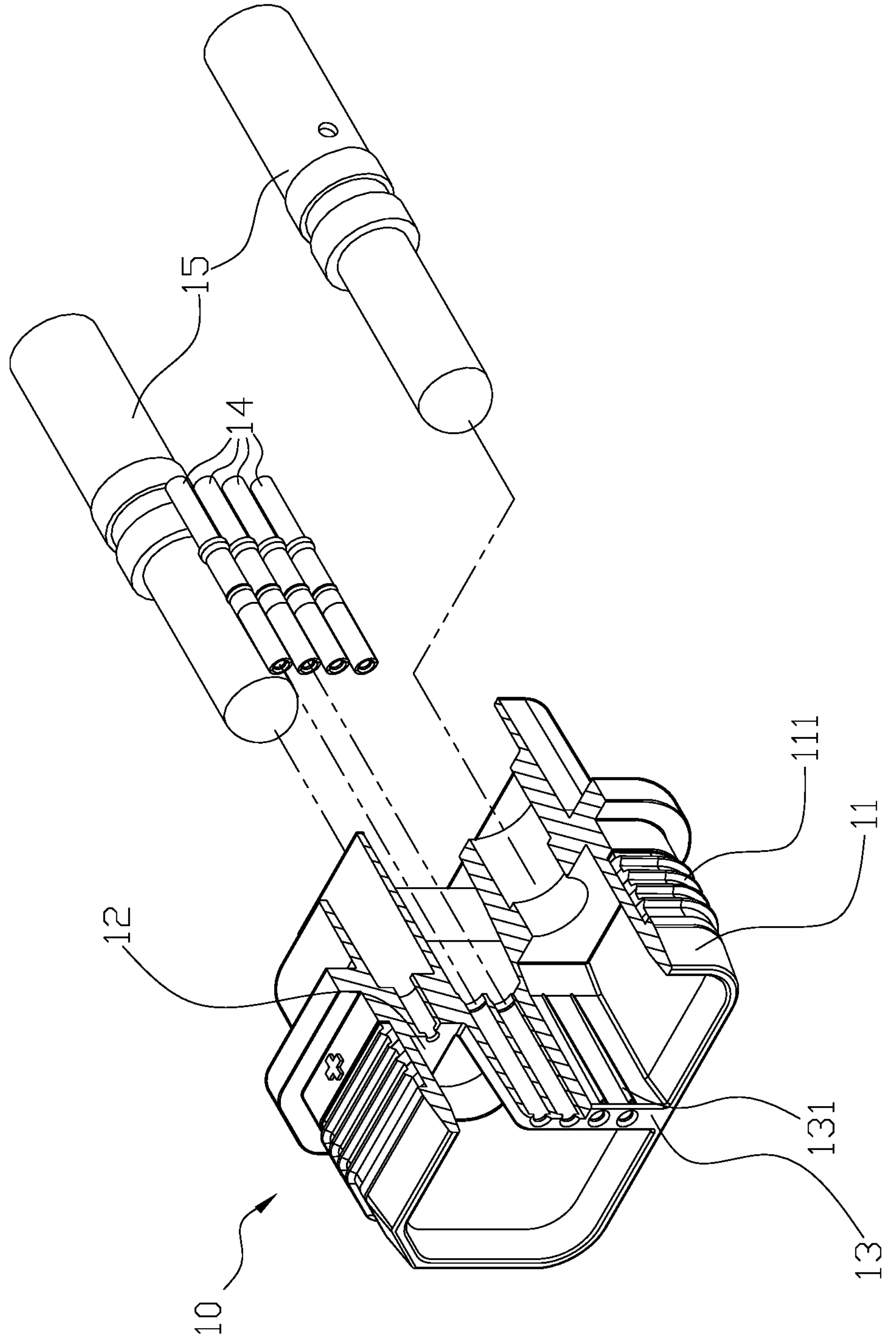
FIG. 4 is an exploded view of a first terminal of the electrical connector of the present invention.
Figure 5:
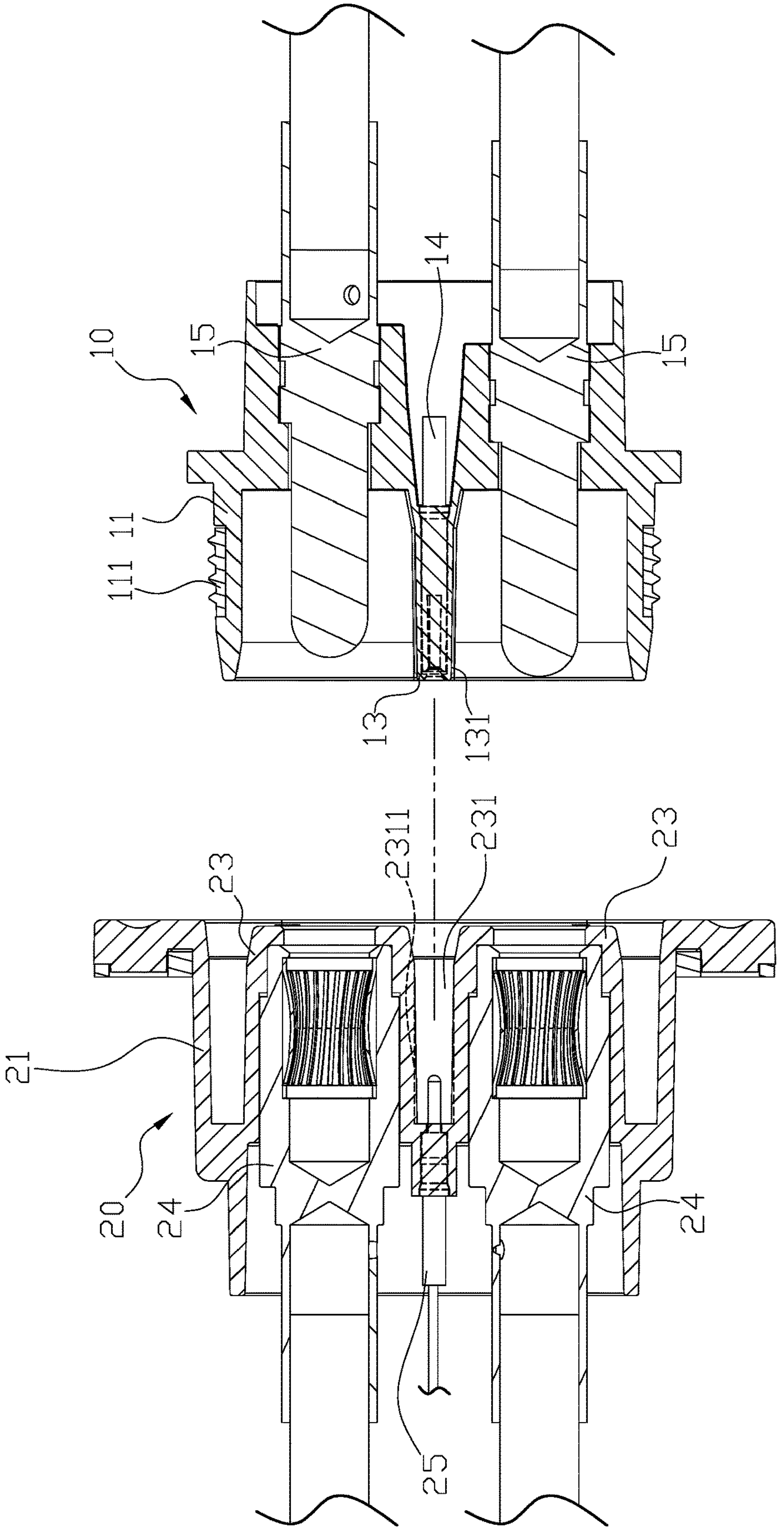
FIG. 5 is a top sectional view of the electrical connection of the present invention illustrating the first terminal and the second terminal are not connected.
Figure 9:
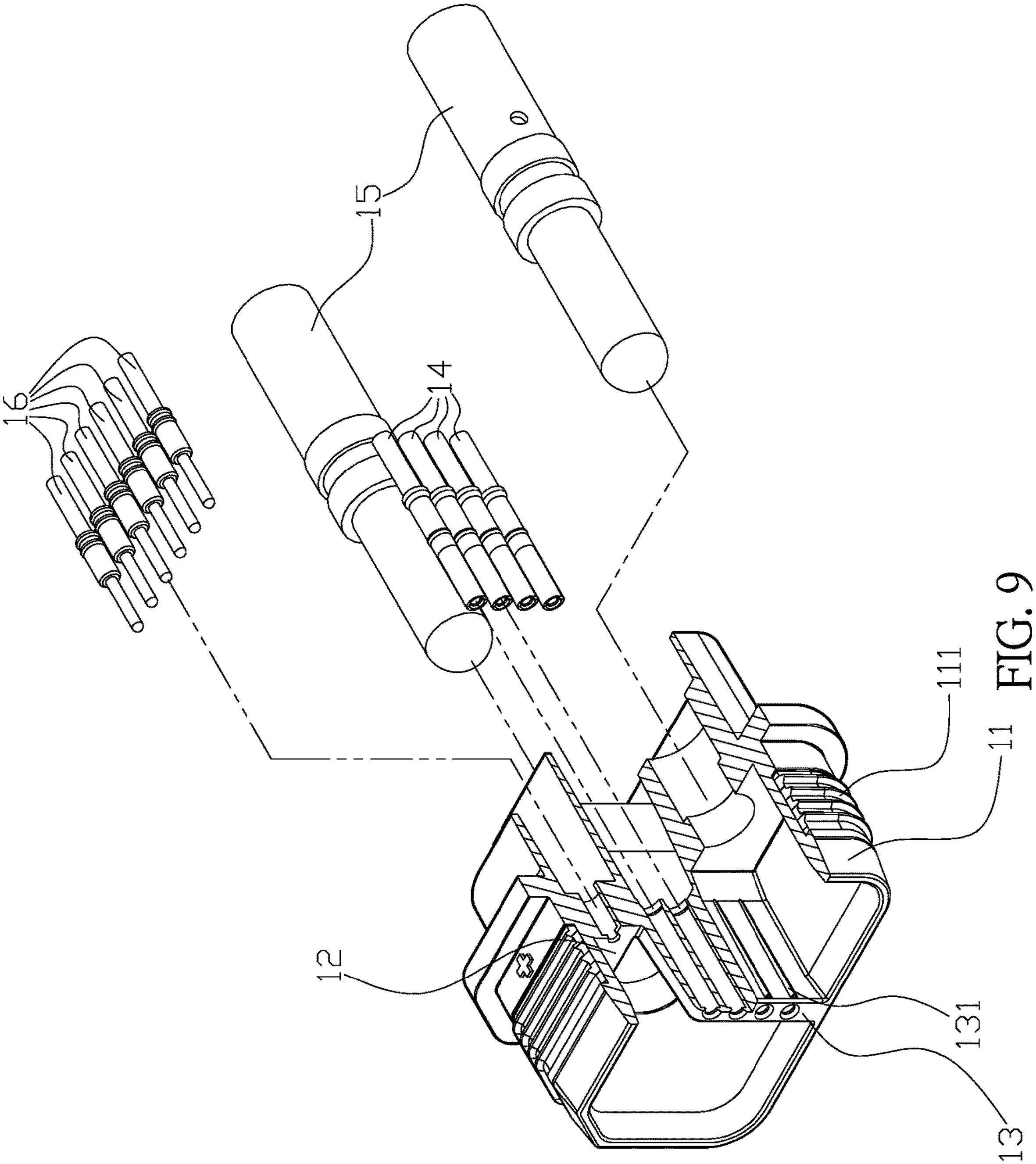
FIG. 9 is an exploded view of a second embodiment of the first terminal of the electrical connection in the present invention.
Figure 10:
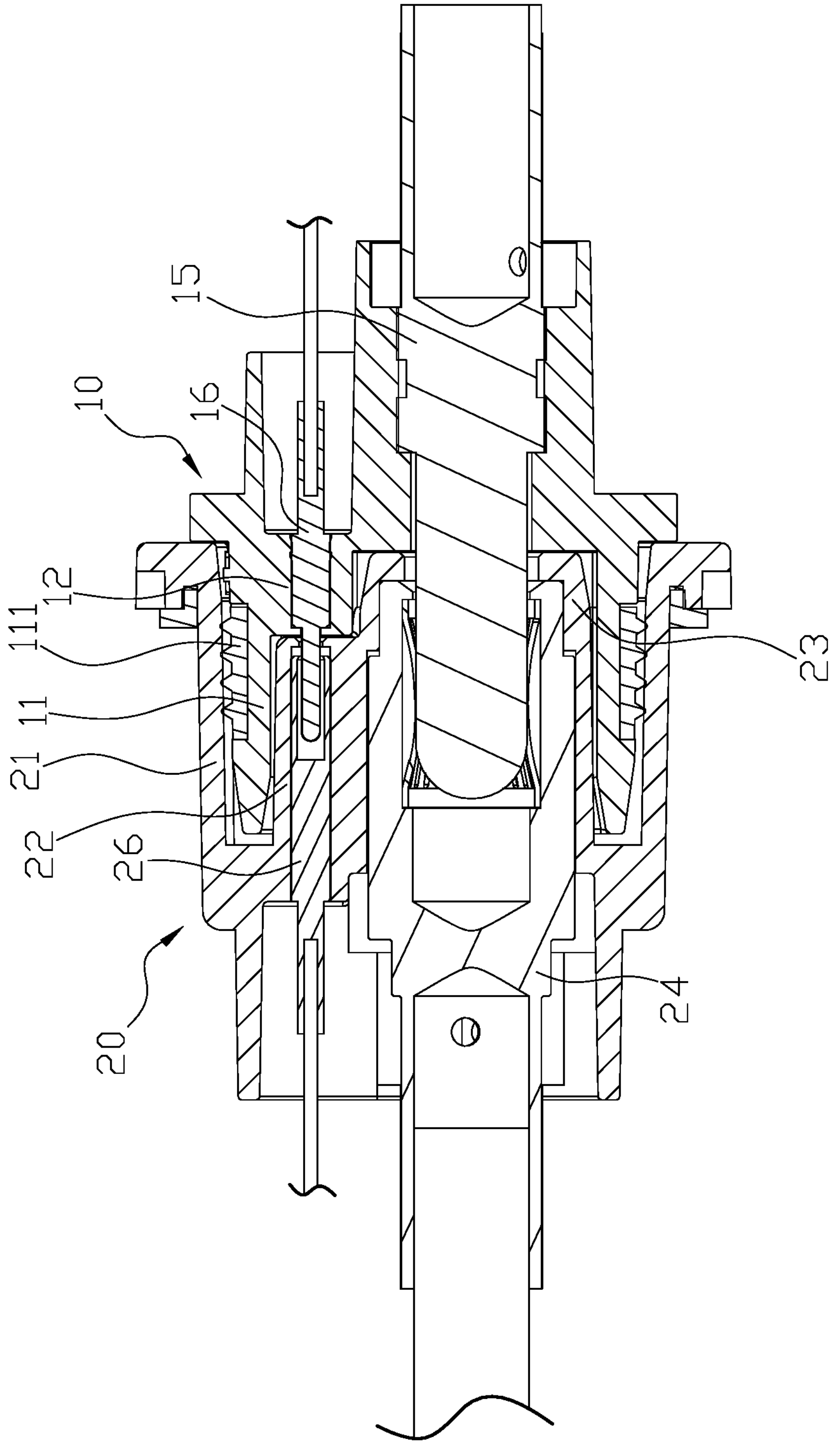
FIG. 10 is a lateral sectional view of the second embodiment of the electrical connection in the present invention.

Referring to FIGS. 3, 9 and 10, in another embodiment, the signal base (12) further comprises a plurality of signal pins (16) while the signal socket (22) further has a plurality of signal holes (26), and when the first base (11) of the first terminal (10) is inserted into the second base (21) of the second terminal (20), the signal pins (16) are respectively inserted into the signal holes (26) so as to transmit small current and small signal.

Figure 2:
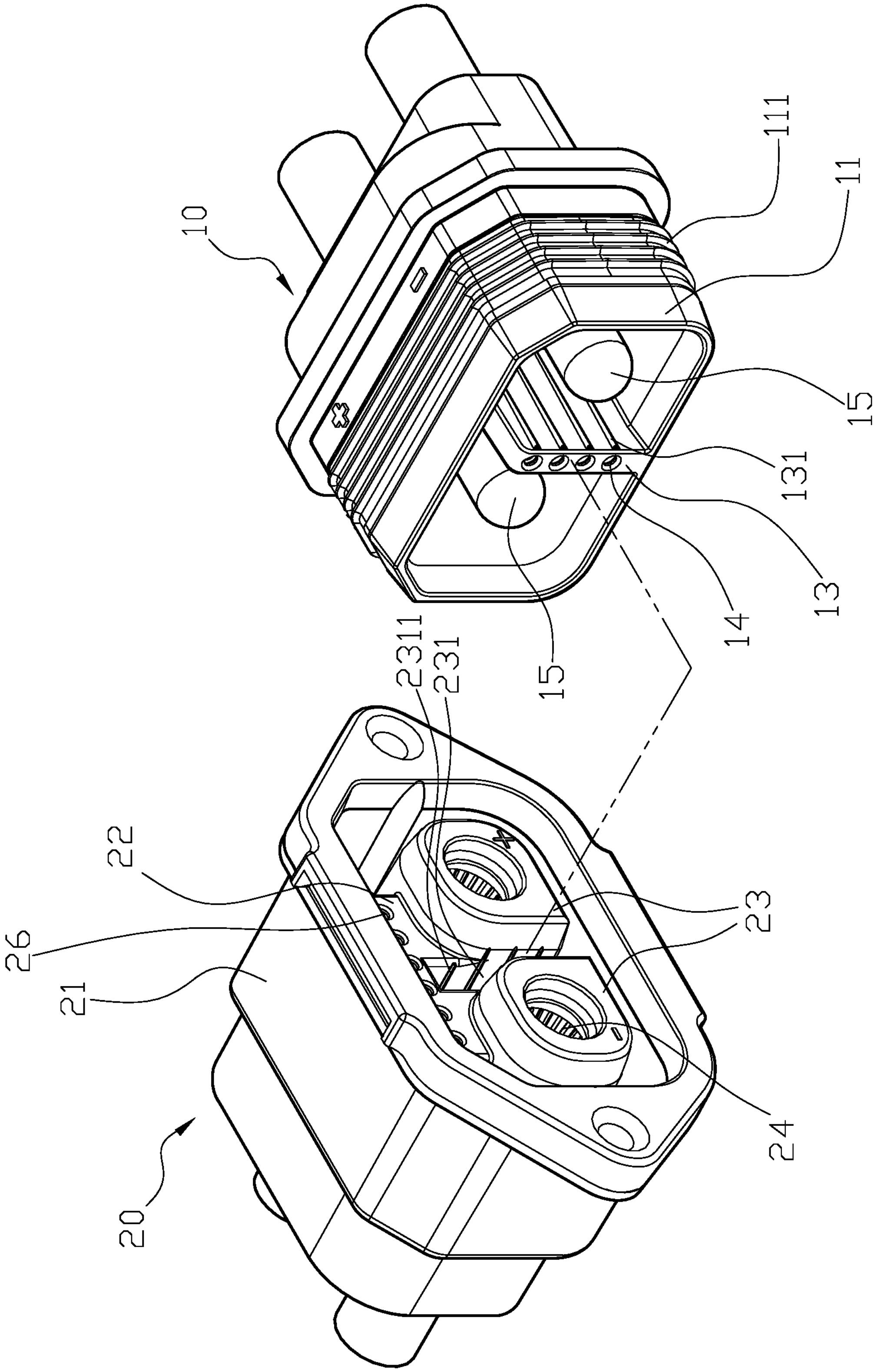
FIG. 2 is a three-dimensional exploded view of the electrical connector of the present invention.
Figure 6:
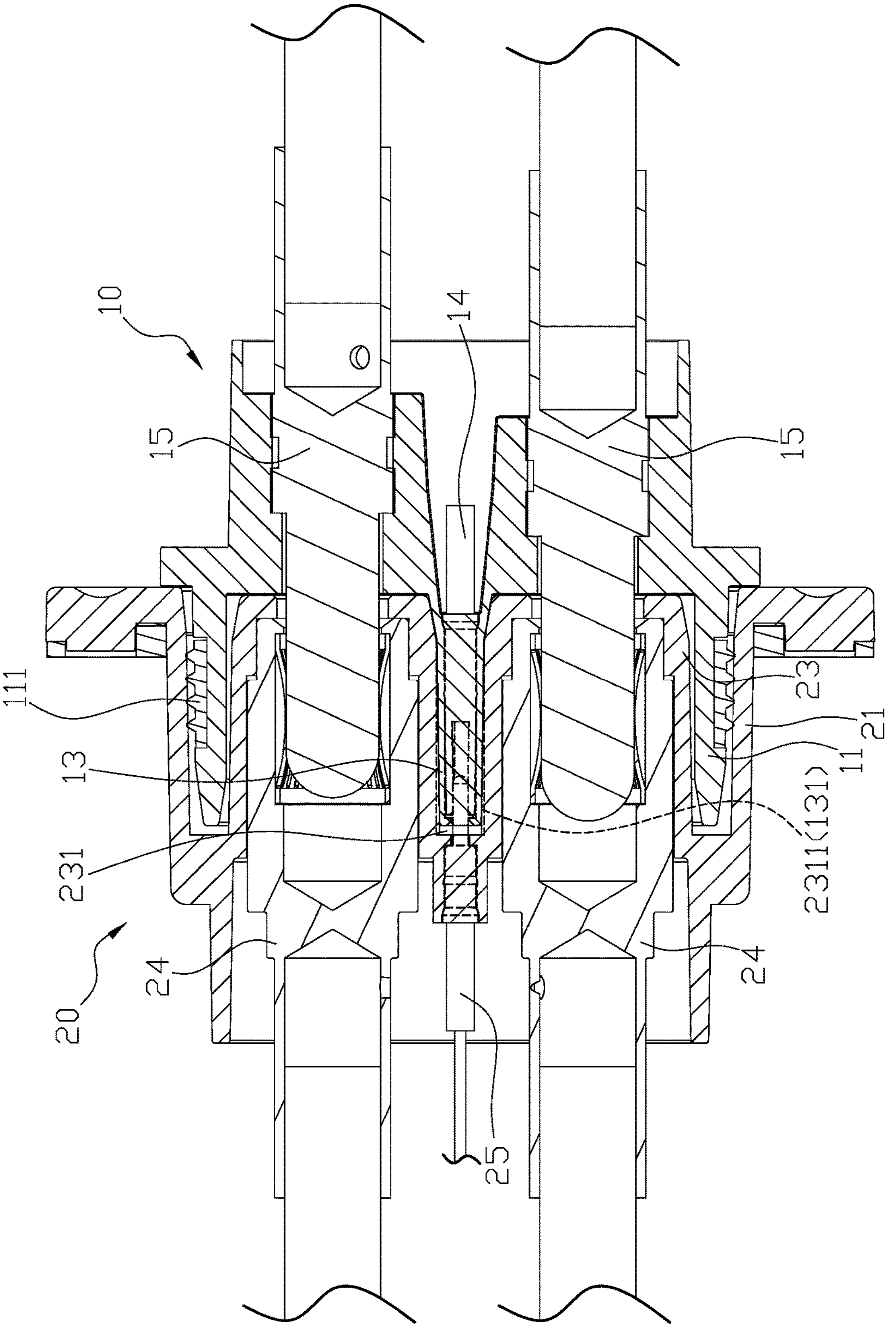
FIG. 6 is a top sectional view of the electrical connection of the present invention illustrating the first terminal and the second terminal are connected.
Figure 7:
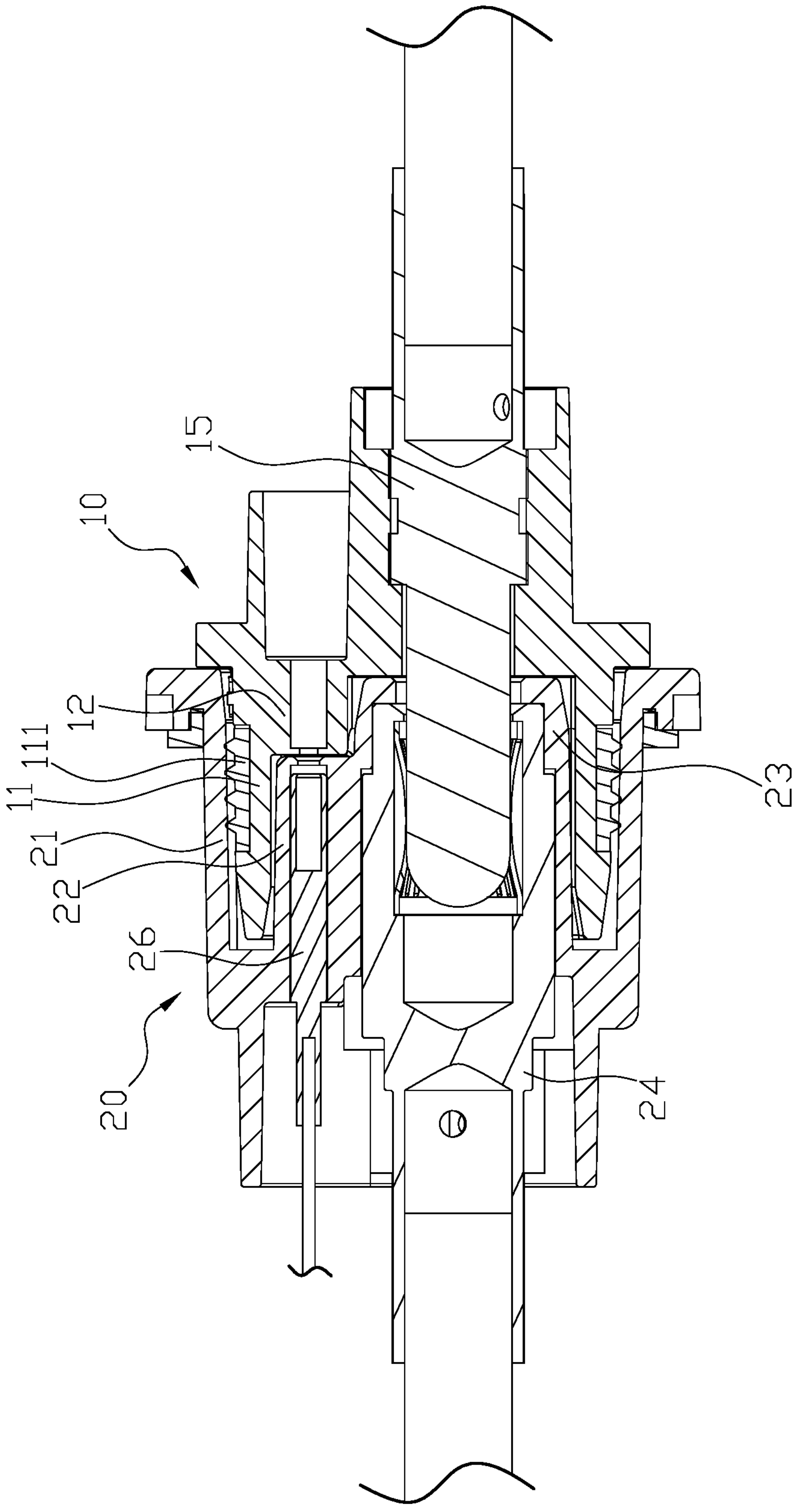
FIG. 7 is a top sectional view of the electrical connection of the present invention.
Figure 8:
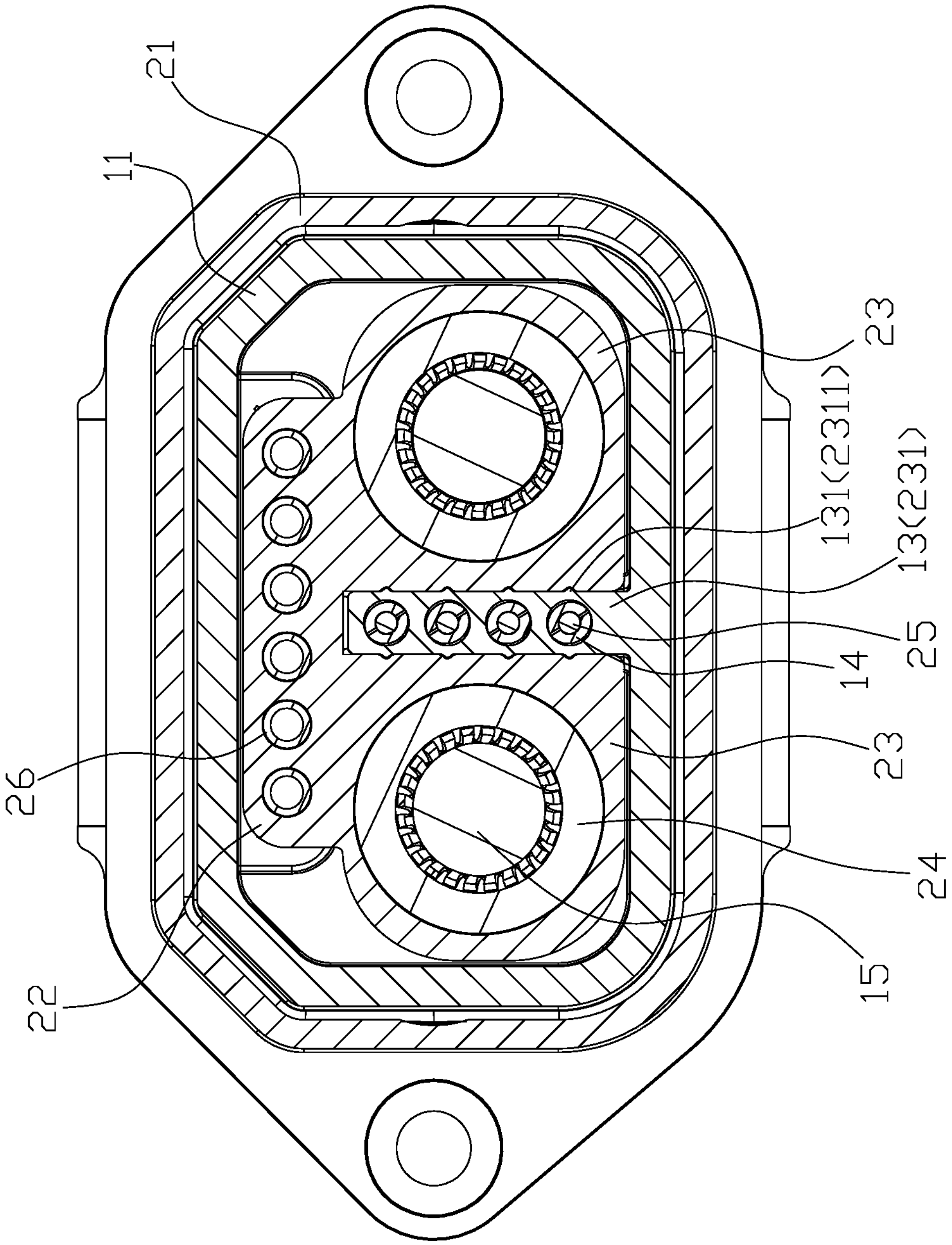
FIG. 8 is a front sectional view of the electrical connection of the present invention.

Referring to FIGS. 2 and 3, a wave-shape elastic ring (111) is disposed on the outer periphery of the first base (11), and referring to FIGS. 6 and 7, when the first base (11) of the first terminal (10) is inserted into the second base (21) of the second terminal (20), the elastic ring (111) is configured to bear against the inner surface of the second base (21) so as to achieve the anti-slip and waterproof effects.

Referring to FIGS. 1 to 4, each pair of the plug pin (25) and the pin hole (14) is used as a terminal and a port for transmitting small current or small signal.

In one embodiment, each pair of the plug pin (25) and the pin hole (14) has no conductive function and is used for guiding and stabilizing the structure.

Referring to FIGS. 1 to 4, each pair of the plug rod (15) and the plug hole (24) is used as a terminal and a port for transmitting large current or large signal.

Figure 11:
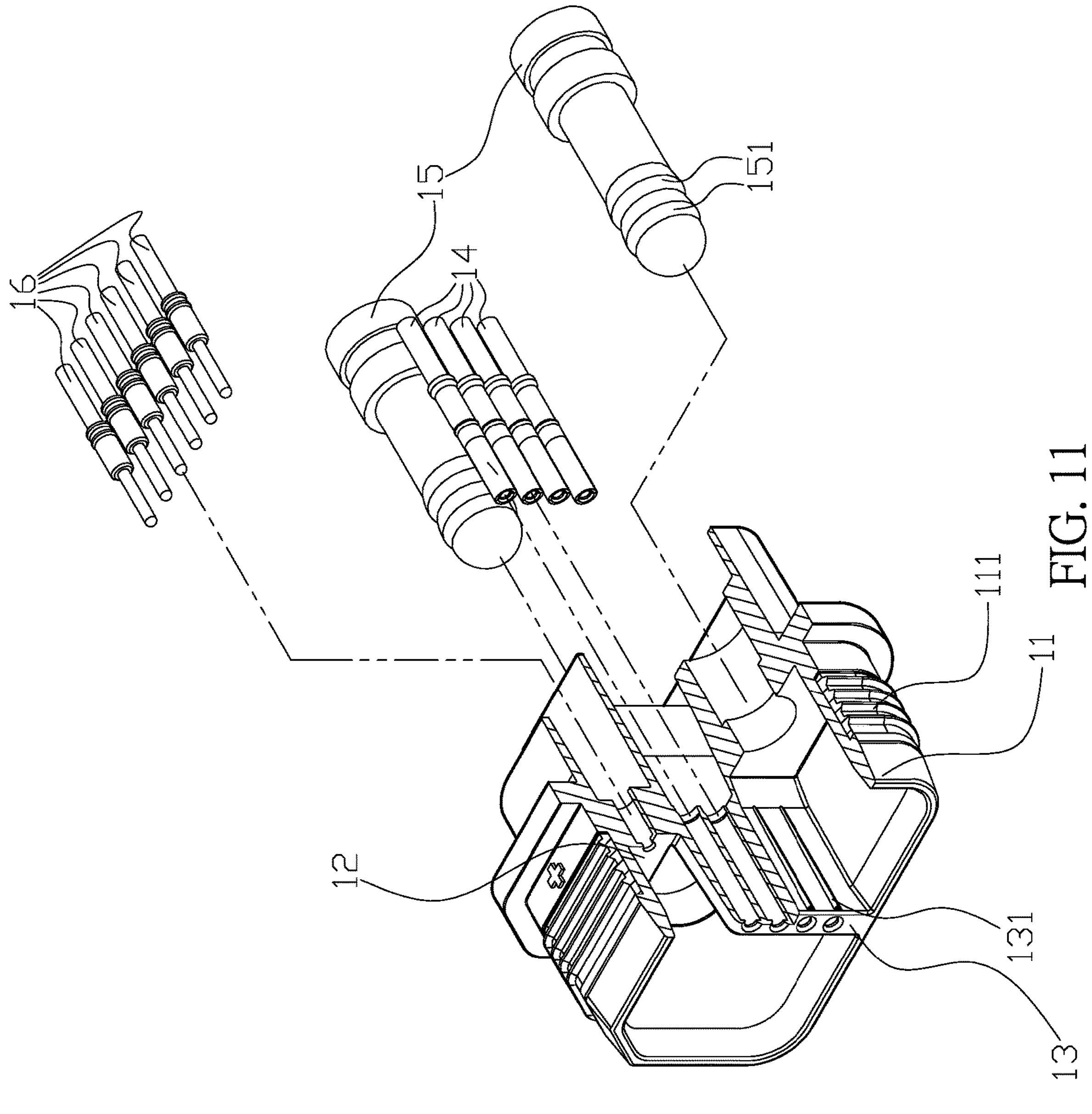
FIG. 11 is an exploded view of a third embodiment of the first terminal of the electrical connection in the present invention.
Figure 12:
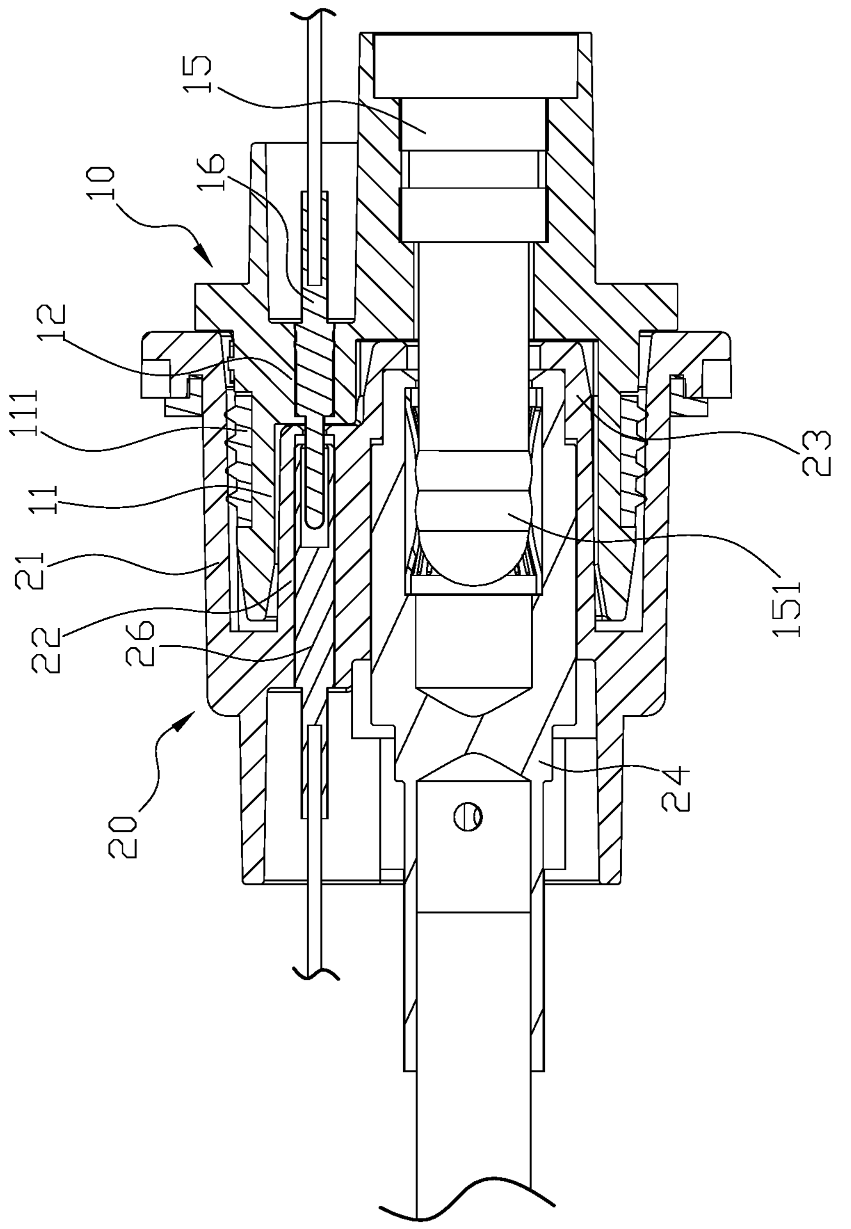
FIG. 12 is a lateral sectional view of the third embodiment of the electrical connection in the present invention.

In another embodiment, referring to FIGS. 11 and 12, each pair of the plug rod (15) and the plug hole (24) has no conductive function and is used for guiding and stabilizing the structure.

Referring to FIGS. 11 and 12, each of the plug rods (15) has at least an anti-slip edge (151), and when the plug rod (15) is inserted into the plug hole (24), the anti-slip edge (151) is borne against the inner surface of the plug hole (24) so as to secure the connection between the first terminal (10) and the second terminal (20).

In a further embodiment, the inner diameter of the pin hole (14) is less than 3 mm to comply with standard IEC 60335, that the 3 mm diameter of probe rod cannot be inserted into the pin hole (14), so as to prevent young children from electric shock.

In still a further embodiment, the spacer plate (13) has a draft angle between 1° to 5° with the guiding space (231), so as to achieve labor-saving effect when the first terminal (10) and the second terminal (20) are connected and detached.

Comparing with conventional electrical connector, the present invention is advantageous because: (i) the electrical connector has more than three connecting points between the first terminal (10) and the second terminal (20), which significantly improves the connection thereof; (ii) the cooperation between the guiding flanges (131) and the guiding grooves (2311) will achieve the effect of easy assembly; (iii) the signal base (12) is configured to have the plurality of signal pins (16) that cooperates with the signal holes (26) on the signal socket (22), so that additional signal pins (16) and signal holes (26) are selectively installed if needed in manufacturing, which has the effect of flexibility in manufacturing; (iv) the pair of the plug (25) and the pin hole (14) can be used as a terminal and a port for transmitting small current or small signal or can have no conductive function and only be used for guiding and stabilizing the structure; and the pair of the plug rod (15) and the plug hole (24) can be used as a terminal and a port for transmitting large current or large signal or can have no conductive function and only be used for guiding and stabilizing the structure, that makes the terminal shape adjusted according to the intensity of current; and (v) the inner diameter of the pin hole (14) is less than 3 mm to comply with standard IEC 60335, that the 3 mm diameter of probe rod cannot be inserted into the pin hole (14), so as to prevent young children from electric shock.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An electrical connector comprising a first terminal and a second terminal;

wherein the first terminal has a first base, and a signal base and a spacer plate are formed in the first base; a plurality of guiding flanges protrude from the spacer plate, and the spacer plate has a plurality of pin holes thereon, and two plug rods separated by the spacer plate are installed in the first base;

wherein the second terminal comprises a second base, and a signal socket and two plug rod bases are formed in the second base, and the signal socket is connected to the two plug rod bases; each of the plug rod bases has a plug hole, and a guiding space is formed between the two plug rod bases to receive the spacer plate; a plurality of guiding grooves are formed on the guiding space at the positions corresponding to the guiding flanges of the spacer plate, and the guiding space comprises a plurality of plug pins therein; and wherein the first base of the first terminal is inserted into the second base of the second terminal, and the plug rods are respectively inserted into the plug holes of the plug rod bases, and the guiding flanges are configured to respectively couple with the guiding grooves so as to guide the spacer plate to be positioned into the guiding space, and the plug pins are adapted to respectively insert into the pin holes, thereby completing the connection between the first terminal and second terminal.

2. The electrical connector of claim 1, wherein the signal base comprises a plurality of signal pins while the signal socket has a plurality of signal holes, and when the first base of the first terminal is inserted into the second base of the second terminal, the signal pins are respectively inserted into the signal holes so as to transmit small current and small signal.

3. The electrical connector of claim 1, wherein a wave-shape elastic ring is disposed on the outer periphery of the first base, and when the first base of the first terminal is inserted into the second base of the second terminal, the elastic ring is configured to bear against the inner surface of the second base so as to achieve the anti-slip and waterproof effects.

4. The electrical connector of claim 1, wherein each pair of the plug pin and the pin hole is used as a terminal and a port for transmitting small current or small signal.

5. The electrical connector of claim 1, wherein each pair of the plug pin and the pin hole has no conductive function and is used for guiding and stabilizing the structure.

6. The electrical connector of claim 1, wherein each pair of the plug rod and the plug hole is used as a terminal and a port for transmitting large current or large signal.

7. The electrical connector of claim 1, wherein each pair of the plug rod and the plug hole has no conductive function and is used for guiding and stabilizing the structure.

8. The electrical connector of claim 7, wherein each of the plug rods has at least an anti-slip edge, and when the plug rod is inserted into the plug hole, the anti-slip edge is borne against the inner surface of the plug hole so as to secure the connection between the first terminal and the second terminal.

9. The electrical connector of claim 1, wherein the inner diameter of the pin hole is less than 3 mm.

10. The electrical connector of claim 1, wherein the spacer plate has a draft angle between 1° to 5° with the guiding space.

* * * * *